United States Patent [19]

Suzuki et al.

[11] Patent Number: 4,712,211

[45] Date of Patent: Dec. 8, 1987

[54] NETWORK SYSTEM UTILIZING AN INTERMEDIATE SYNCHRONIZATIONS SIGNAL AND PREDETERMINED CODE STRING PATTERNS

[75] Inventors: Tadashi Suzuki, Yokohama; Kazuyoshi Okada; Noriyuki Abe, both of Yokosuka, all of Japan

[73] Assignee: Nissan Motor Company, Limited, Japan

[21] Appl. No.: 836,622

[22] Filed: Mar. 5, 1986

[30] Foreign Application Priority Data

Mar. 25, 1985 [JP] Japan .................................. 60-58270
Mar. 25, 1985 [JP] Japan .................................. 60-58271

[51] Int. Cl.[4] ............................ H04J 3/06; H04L 7/00
[52] U.S. Cl. ...................................... 370/100; 375/108
[58] Field of Search ............... 375/108, 7, 8; 370/100, 370/106, 110.1, 85

[56] References Cited

U.S. PATENT DOCUMENTS 3,593,160 7/1971 Moore .................................. 370/100
4,164,629 8/1979 Ollivier et al. ....................... 375/108
4,359,770 11/1982 Suzuka ................................ 370/100
4,484,190 11/1984 Bedard .......................... 340/825.57
4,621,360 11/1986 Inoue ..................................... 370/85

FOREIGN PATENT DOCUMENTS 1096403 12/1967 United Kingdom .
1287334 8/1972 United Kingdom .
1298190 11/1972 United Kingdom .
1427133 3/1976 United Kingdom .
1462052 1/1977 United Kingdom .
1494240 12/1977 United Kingdom .
2041592A 9/1980 United Kingdom .

OTHER PUBLICATIONS

Ein Byteserielles Bitparalleles Schnittstellensystem fur Programmierbare Mebgerate—DIN IEC 625 Teil 1 Mai 1981.
Wie Funktioniert der IEC-Bus?—Elektronik 1975.
Microprocessor Tnterfacing Techniques–Zaks.

*Primary Examiner*—Douglas W. Olms
*Assistant Examiner*—Frank M. Scutch, III
*Attorney, Agent, or Firm*—Lowe, Price, LeBlanc, Becker & Shur

[57] ABSTRACT

A network system having a plurality of data transmitters and receivers interconnected to a data transmission line and to a time series code string signal transmission line. In the network system, a first pulse train signal according to a predetermined time series code is produced and sent on the time series code string signal transmission line. In each data transmitter and receiver, the first pulse train signal is received and demodulated to form an intermediate synchronization signal and a plurality of predetermined code string patterns. When one of the plurality of predetermined code string patterns accords with a predetermined address code in one of time slots, either data transmitter or data receiver transmits or receives a data of a predetermined number of bits in a Non-Return To Zero code to or from the data transmission line in synchronization with a data transmission and reception enable clock signal predetermined by a data transmission and reception enable clock (oscillator) whose frequency variation is corrected by means of the intermediate synchronization signal one time or a plurality number of times by a predetermined number of bits of data so that a reliable data transmission without synchronization deviation between the data transmitter and data receiver(s) and without generation of high frequency noise can be achieved.

20 Claims, 57 Drawing Figures

FIG. 4
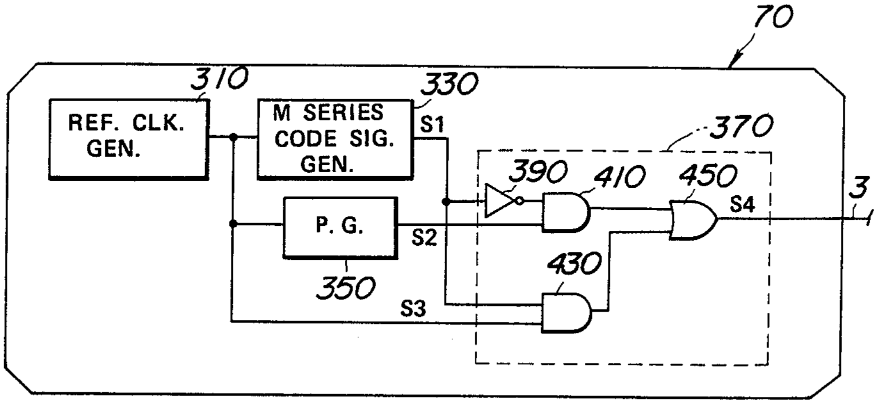
FIG. 5(a)
FIG. 5(b)
FIG. 5(c)
FIG. 5(d)
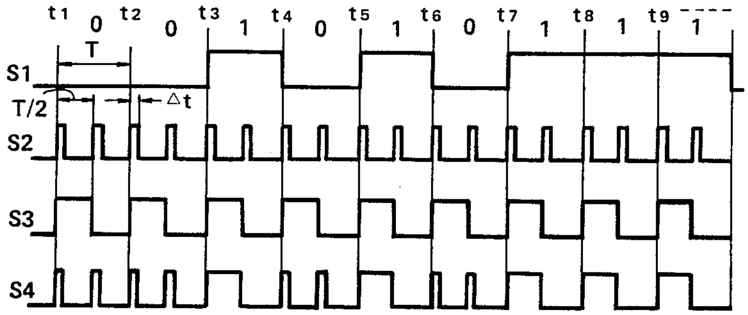

FIG. 6
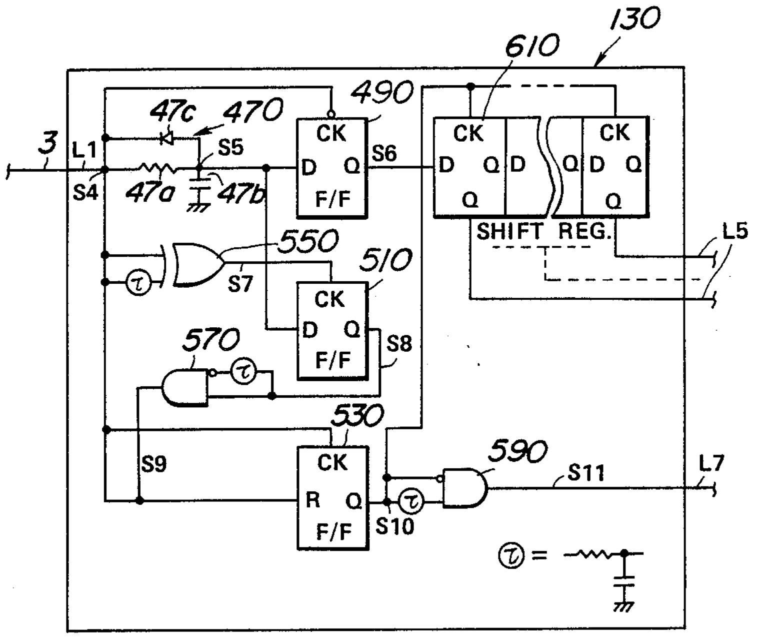
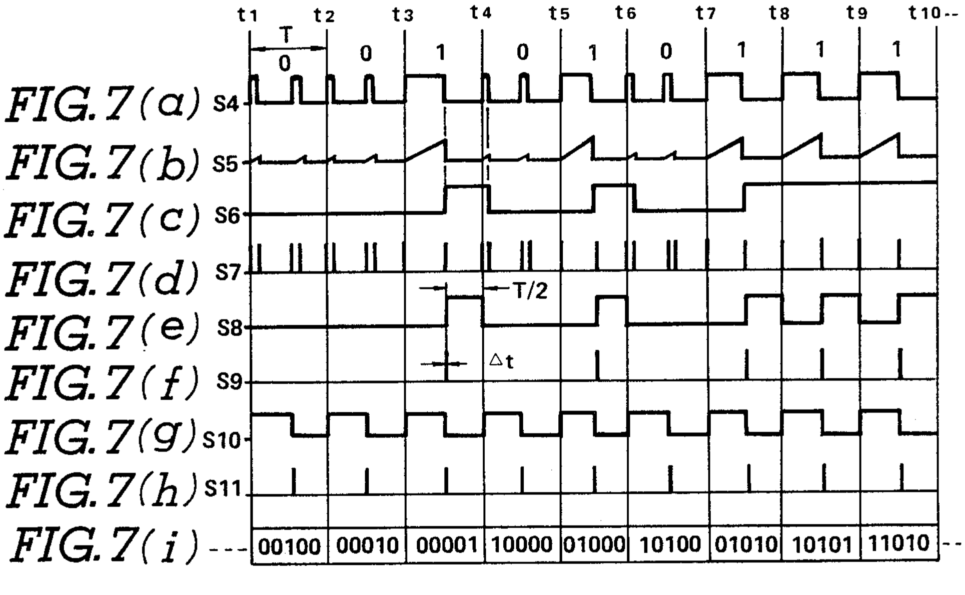
FIG. 7(a)
FIG. 7(b)
FIG. 7(c)
FIG. 7(d)
FIG. 7(e)
FIG. 7(f)
FIG. 7(g)
FIG. 7(h)
FIG. 7(i)

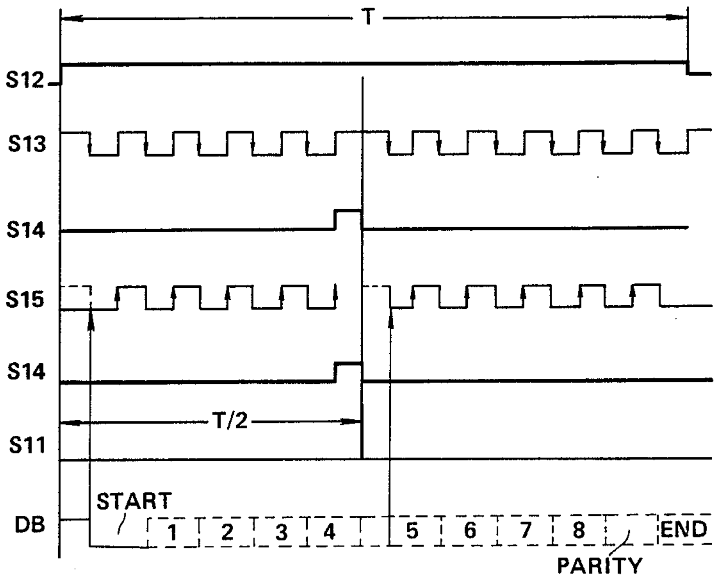
FIG.10(a)
FIG.10(b)
FIG.10(c)
FIG.10(d)
FIG.10(e)
FIG.10(f)
FIG.10(g)
FIG. 11
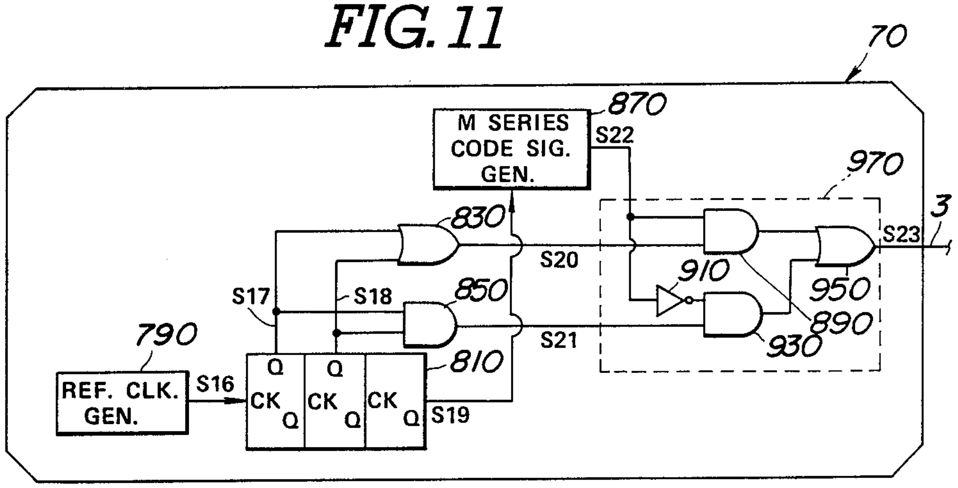

FIG.12(a)
FIG.12(b)
FIG.12(c)
FIG.12(d)
FIG.12(e)
FIG.12(f)
FIG.12(g)
FIG.12(h)
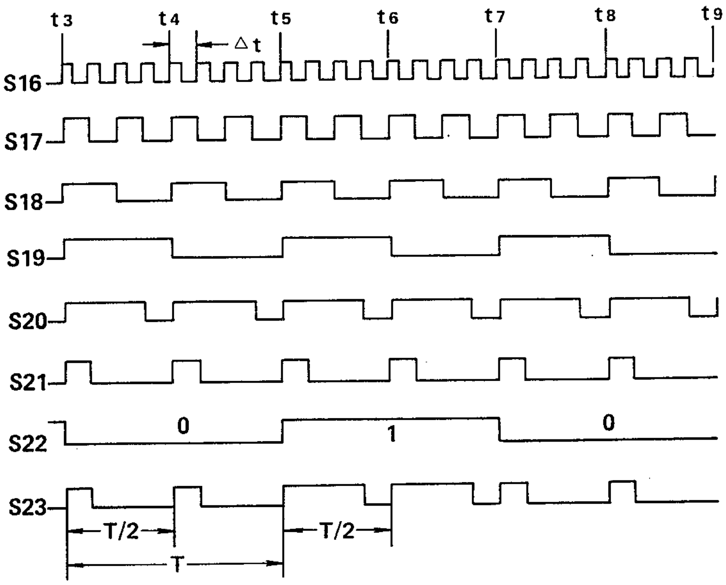
FIG.13
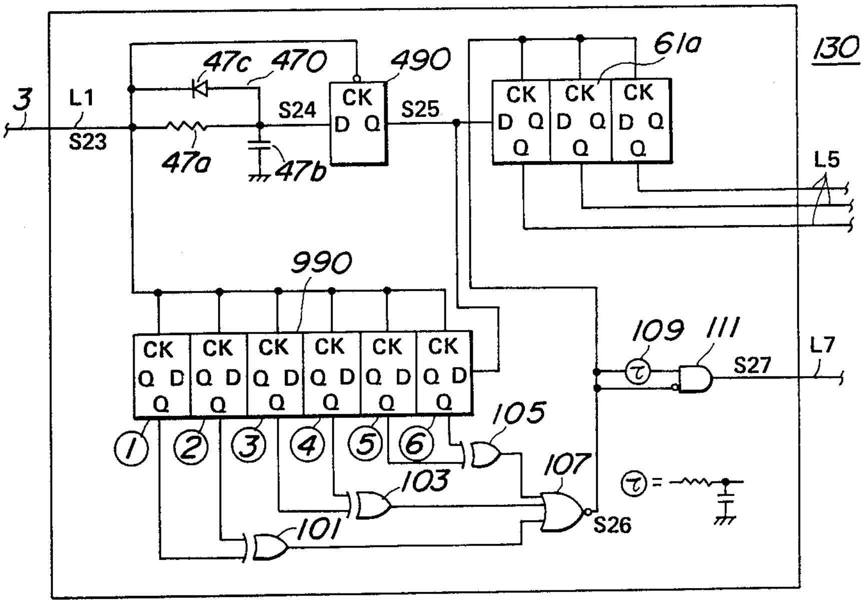

NETWORK SYSTEM UTILIZING AN INTERMEDIATE SYNCHRONIZATIONS SIGNAL AND PREDETERMINED CODE STRING PATTERNS

BACKGROUND OF THE INVENTION

1. Field Of the Invention

The present invention relates to a time-division multiplex transmission network system in which data having a predetermined number of bits can be transferred between a great number of data transmitters and data receivers in a time division mode with a high efficiency and high reliability and without generation of high-frequency noise on signal transmission lines.

2. Description Of the Prior Art

Conventional network systems are exemplified by a Japanese Patent Application Examined Open No. Sho. 52-13367.

The network system disclosed in Japanese Patent Application Examined Open No. Sho. 52-13367 comprises a plurality of data transmission stations and data reception stations, these data stations being interconnected via a synchronizing signal transmission line and data transmission line, and a synchronizing signal generator which generates and sends a synchronizing signal to each data station via the synchronizing signal transmission line. The synchronizing signal generator generates the synchronizing signal such that a level change in an M-series code signal repeating an order of H, H, L, L, H, and L at a constant interval T is modulated in a pulse width modulation method by means of a clock signal having a period of $\tau$.

On the other hand, each data transmission station comprises: a reception circuit which receives the synchronizing signal from the synchronizing signal generator and demodulates the received synchronizing signal into the clock signal and the M-series code signal; a multi-bit shift register which shifts sequentially the demodulated code signal in synchronization with the clock signal; and a logic gate circuit which opens the gate when the output of each stage of the shift register is logically calculated and gives a predetermined logic result. A combination logic pattern of "H" and "L" levels of the shift register appears seven kinds during one period of the M-series code signal. Therefore, if any one of the seven kinds of combination pattern is selected as an establishment condition of the logic gate circuit, the gate thereof is opened only once during the one interval of the M-series code signal so that a data output circuit outputs one bit of data to the data transmission line.

Similarly, each data reception circuit is so constructed that when a predetermined logic combination pattern appears during the one interval of the M-series code signal, a gate thereof is opened so that one bit of data can be received. In this way, data transmission and reception between one of the data transmission stations and one of the data reception stations which has the same gate opening logic condition as the data transmission station becomes possible so that the data transmission and reception can be carried out without collision of data which is transmitted and received between any othere data stations.

On the other hand, there is a demand in a general network system that a parity bit is added to an on-and-off information on such as a switch or an information on such as level intensity or switching timing in addition to the above-described on-and-off information is transmitted as data having a plurality of bits. In this case, if such a data is transmitted using the above-described conventional network system, the data must be transmitted by one bit whenever the address coincidence occurs, i.e., a plural numbers of times the address coincidence must be carried out to transmit a single data so that a longer time of data transmission is required.

Another network system which improves the above-described network system has been proposed in a Japanese Patent Application Unexamined Open No. Sho. 59-230348 published on Dec. 24, 1984.

In the network system disclosed in the Japanese Patent Application Unexamined Open No. Sho. 59-230348 (U.S. application Ser. No. 592,547 filed on Mar. 23, 1984 now pending), once an address derived from the synchronizing signal accords with that specified to one of the data transmission stations and one of the data reception stations between which data having a plurality of bits are to be transmitted and received, the data having the plurality of bits can be transmitted and received at one time in a pulse-width modulation method.

Since in the later conventional network system the data having, e.g., four bits can be transmitted within a reference time of the synchronizing signal having a frequency of, e.g., 512 Hz, the data transmission can be carried out at a higher speed. Since it is possible to include the parity bit in the four bits, the reliability of data transmission can accordingly be improved.

However, although it is desirable for a network system which can transmit wholly data comprising multiple bits more than four bits at a high speed to extend its application fields, the network system disclosed in the latter Japanese Patent Application may result in a generation of high frequency noise due to excessively high transmission frequency in its data transmission line.

SUMMARY OF THE INVENTION

With the above-described problem in mind, it is an object of the present invention to provide an inexpensive network system in which transmission and reception of data having a plurality of bits are carried out at a higher speed without generation of high frequency noise from a data transmission line.

This can be achieved by providing a network system having a plurality of interconnected data processing stations, which comprises: (a) first means for generating and transmitting a periodic first pulse train signal according to a predetermined time series code string, (b) second means for processing the first pulse train signal received from the first means to form at least one intermediate synchronization signal and one of a plurality of predetermined code string patterns sequentially during a time slot defining at least one code of the predetermined time series code on the basis of the first pulse train signal, (c) third means, including a data transmission and reception enable clock, for outputting a data transmission and reception enable clock signal whenever each time slot defining either code of the predetermined time series code string is started, while correcting a frequency variation of the data transmission and reception enable clock by means of the intermediate synchronization signal received from the second means, (d) fourth means for determining whether one of the plurality of predetermined code string patterns received from the second means accords with a predetermined code indicating an address thereof, and (e) fifth means for carrying out at least one of transmission and reception of a data of a predetermined number of bits in a Non-Return-To-Zero code in synchronization with the corrected data transmission and reception enable clock signal received from the third means depending on the contents of the predetermined address code when the fourth means determines that the one of the plurality of predetermined code string patterns accords with the predetermined address code.

BRIEF DESCRIPTION OF THE DRAWINGS

A more complete understanding of the present invention may be obtained from the following detailed description taken in conjunction with the attached drawings in which:

FIG. 4 is an internal circuit block diagram of an address clock generator shown in FIG. 3;

FIGS. 5(*a*) through 5(*d*) are timing charts of output signal levels of respective circuits shown in FIG. 4;

FIG. 6 is an internal circuit block diagram of an address reproduction circuit 13 provided in each data station shown in FIG. 3;

FIGS. 7(*a*) through 7(*i*) are timing charts of output signals of respective circuits in the address reproduction circuit 13 shown in FIG. 6;

FIGS. 10(*a*) through 10(*g*) are timing charts of output signals of respective circuits shown in FIGS. 8 and 9;

FIG. 11 is an internal circuit block diagram of an address clock generator of the network system of the third preferred embodiment according to the present invention;

FIGS. 12(*a*) through 12(*h*) are timing charts of output signals of respective circuits of the address clock generator shown in FIG. 11;

FIG. 13 is an internal circuit block diagram of an address reproduction circuit 13 of the third preferred embodiment.

DETAILED DESCRIPTION OF THE PREFERRED EMBODIMENTS

Reference will hereinafter be made to the drawings in order to facilitate understanding of the present invention.

Figure 1:
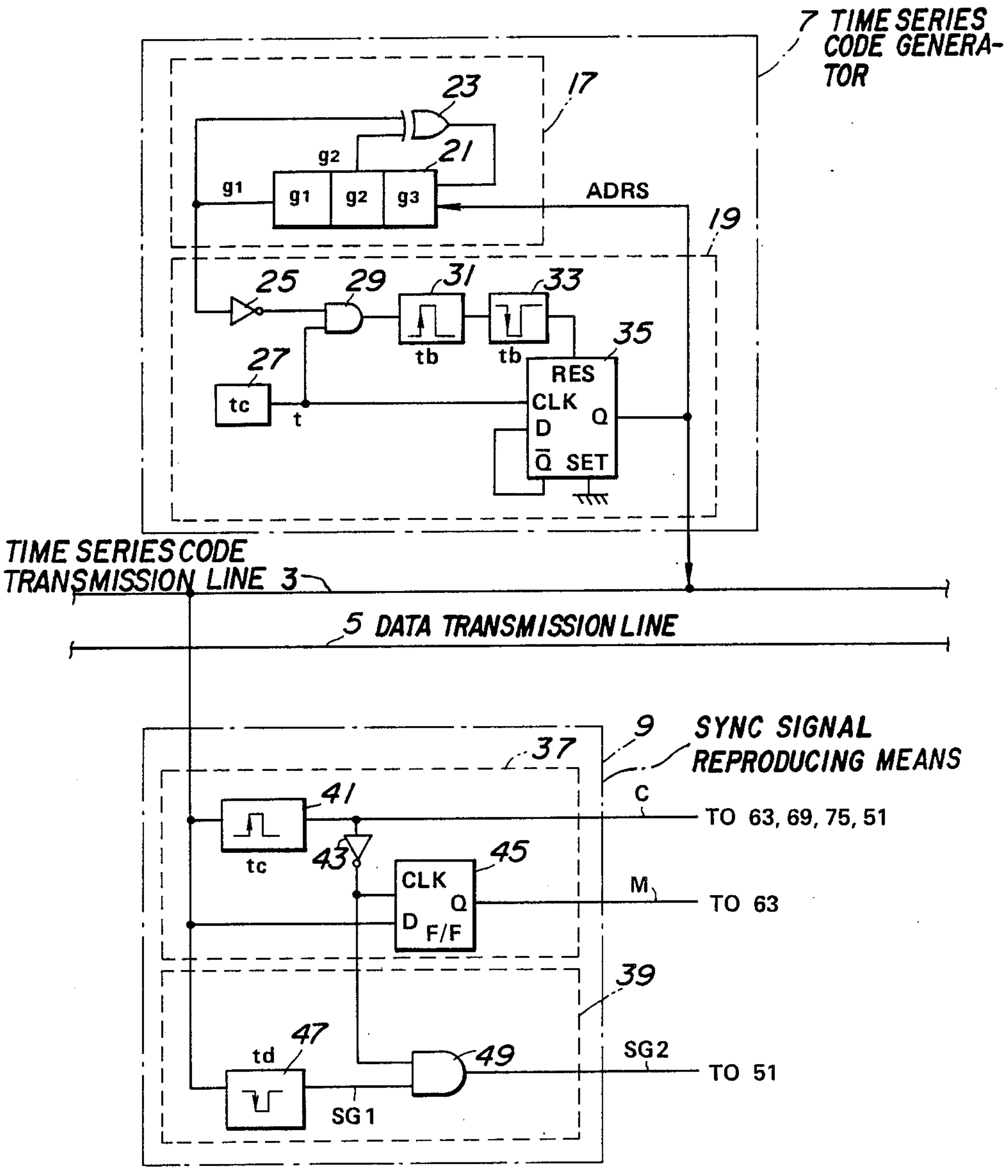
FIGS. 1(*a*) and 1(*b*) are an integrally circuit block diagram of a network system of a first preferred embodiment according to the present invention.
Figure 1B:
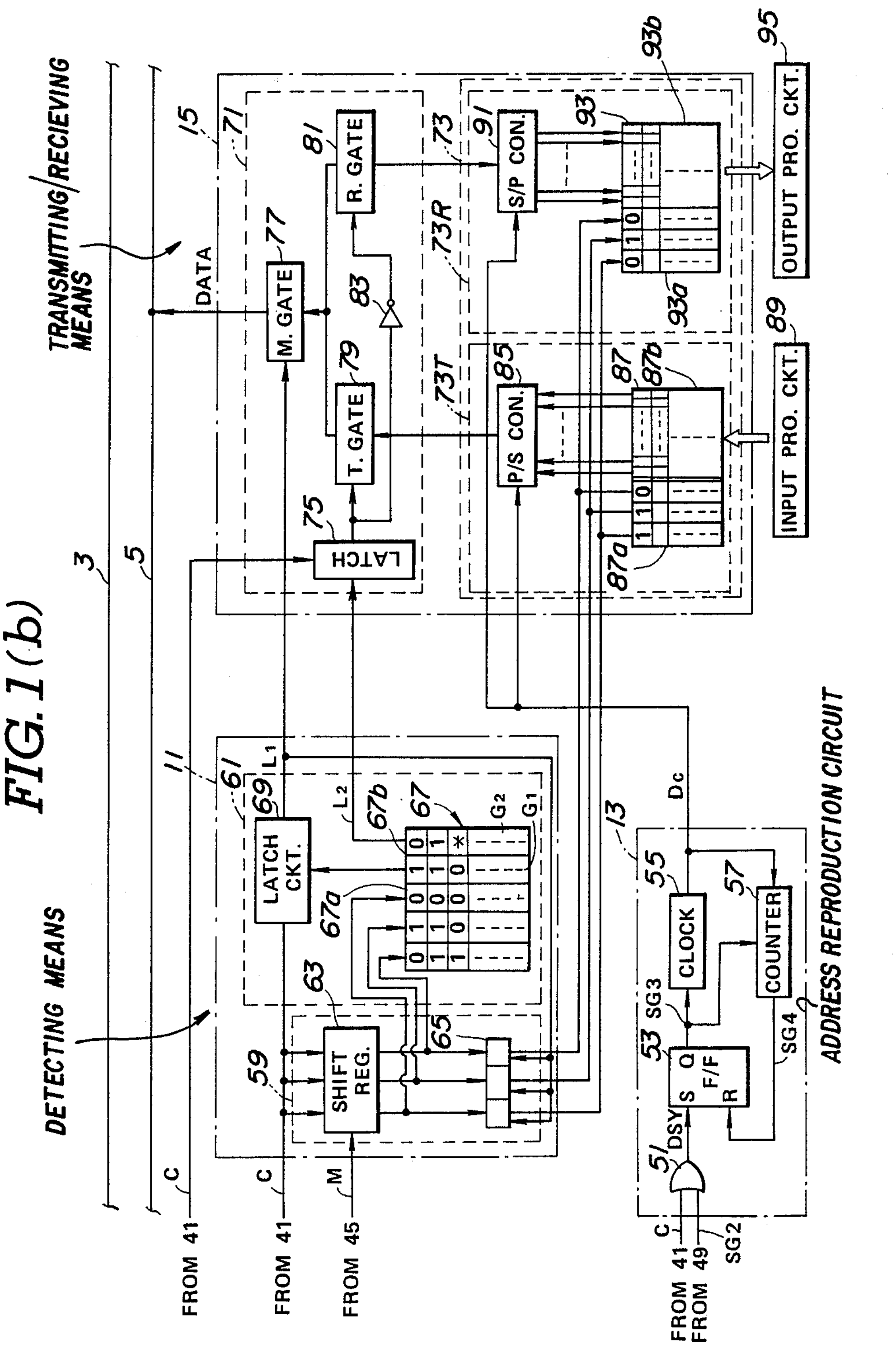
Figures 2A, 2B, 2C, 2D, 2E, 2F, 2G, 2H, 2I, 2J, 2K, 2L, 2M, 2N:
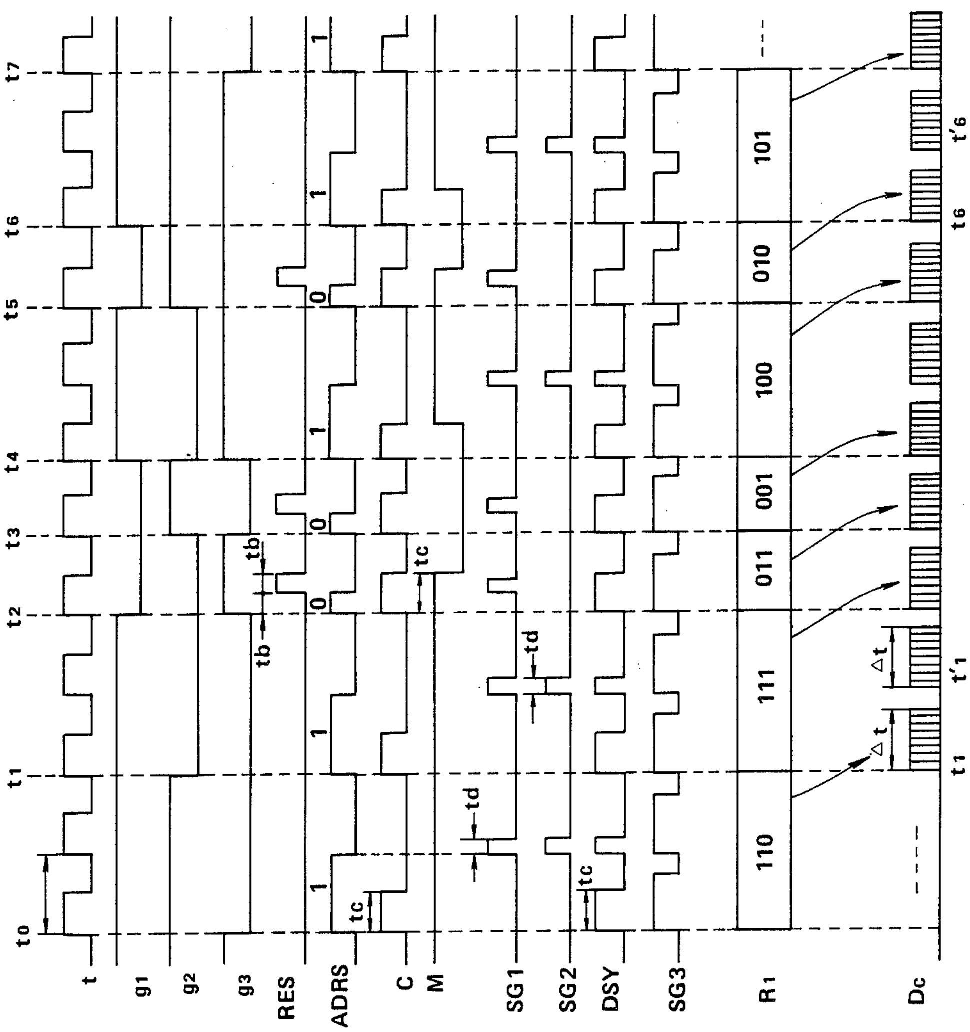
FIGS. 2(*a*) through 2(*n*) are timing charts of output signals of internal circuits in the network system shown in FIGS. 1(*a*) and 1(*b*)

FIGS. 1(*a*) and 1(*b*) show a network system of a first preferred embodiment and FIGS. 2(*a*) through 2(*n*) show timing charts of output signals from respective circuits shown in FIGS. 1(*a*) and 1(*b*).

As shown in FIGS. 1(*a*) and 1(*b*), the network system 1 comprises: a time series code transmission line 3; and a data transmission line 5. Means for generating a time series code 7 enclosed by a dot-and-dash line in FIG. 1(*a*) is connected to the time series code transmission line 3. Means for reproducing a synchronizing signal 9 enclosed by a dot-and-dash line, means for detecting a serial code string pattern 11 shown in FIG. 1(*b*), means for forming an enable clock signal Dc for enabling data transmission and reception 13 shown in FIG. 1(*b*). and means for transmitting and receiving data 15 these means 9, 13, and 15 constituting a data transmission/-reception station shown in FIGS. 1(*a*) and 1(*b*) are connected to the above-described time-series code transmission line 3 and data transmission line 5, respectively.

It should be noted that in this embodiment the data transmission/reception station can be used either as data transmitter or as data receiver. It should also be noted that although one data transmission/reception station is shown in FIG. 1(*b*), a plurality of similar data transmission/reception stations are actually connected to these transmission lines so as to constitute the whole network system.

As shown in FIG. 1(*a*), means for generating the time series code 7 comprises: a code series generating circuit 17; and a synchronization signal production circuit 19 these circuits being enclosed by dash lines.

Furthermore, the code series generating circuit 17 comprises a three-bit shift register 21 and an Exclusive-OR gate 23. A first bit stage g1 of the shift register 21 and a second bit stage g2 of the shift register 21 are connected to respective input terminals of the Exclusive-OR gate 23. An output terminal of the Exclusive-OR gate 23 is connected to an input terminal of a third bit stage g3 of the shift register 21. In addition, the third bit stage g3 of the shift register 21 receives an output signal ADRS from the time series code generating means 7, i.e., from the synchronization signal production circuit 19.

When the signal ADRS is inputted to the third bit stage g3 of the shift register 21, a bit value of the third bit stage g3 is shifted to the second bit stage g2, a bit value of the second bit stage g2 to the first bit stage g1, and an output value of the Excusive-OR 23 to the third bit stage g3. Therefore, the first bit stage g1 outputs a three-bit M-series code such as 1100101 in a time serial mode.

The synchronization signal production circuit 19 comprises: an inverter 25 receiving the output signal of the first bit stage g1 of the shift register 21; a reference clock 27; an AND gate 29 taking a logical AND of an output signal of the inverter 25 and a reference clock signal t having a period ta outputted from the reference clock 27; a one-shot multivibrator 31 which is synchronized with an rising edge of its input signal and is connected to an output terminal of the AND gate 29; a one-shot multivibrator 33 which is synchronized with a rising edge of its input signal; and a D-type flip-flop circuit 35 whose reset terminal RES receives the output signal of the one-shot multivibrator 33, clock input terminal CLK receives the reference clock signal t from the reference clock 27, whose inverted output terminal $\overline{Q}$ is connected to a data terminal thereof D, and whose set terminal SET is grounded.

It should be noted that an output terminal Q of the flip-flop circuit 35 is connected to the third bit stage g3 of the above-described shift register 21 and to the time series code transmission line 3.

The one-shot multivibrator 31 outputs one pulse having a pulsewidth tb in synchronization with a change of a signal level of the output signal of the AND gate 29 from a low level to a high level. On the other hand, the one-shot multivibrator 33 outputs one pulse having the pulsewidth tb in synchronization with a change of a signal level of the one-shot multivibrator 31 from a high level to a low level.

Therefore, these one-shot multivibrators 31, 33 can send the pulse signal having the pulsewidth tb to the reset terminal RES of the flip-flop circuit 35 with a time delay of tb with respect to the change in the output signal level of the AND gate 29 from the low level to the high level.

Each signal timing and level of the internal circuits of the time-series code generating means 7 will be described in details with reference to FIGS. 2(*a*) through 2(*n*).

FIG. 2(*a*) shows a signal state of the reference clock t having the constant period ta from the reference clock 27 of FIG. 2(*a*).

FIG. 2(*b*) shows the signal level of the first bit stage change g1 of the shift register 21. FIG. 2(*c*) shows the signal level change of the second bit stage g2 of the shift register 21. FIG. 2(*d*) shows the signal level change of the third bit stage g3. FIG. 2(*e*) shows the output signal level change of the one-shot multivibrator 33. FIG. 2(*f*) shows signal level change of the output terminal Q of the flip-flop circuit 35, i.e., the time-series code signal ADRS.

The third-bit stage output signals g1, g2, g3 as shown in FIGS. 2(*b*), 2(*c*), and 2(*d*) are formed as the Exclusive-ORed signal of the first and second bit stage signals. The third bit signal g3 is sequentially shifted to lesser significant bit stages g2 and g1 in synchronization with each rising edge of the synchronizing signal ADRS on which a time duration is divided into regions of time t0, time t1, time t3, . . . , an time t7. The inverter 25 inverts the output signal of the above-described first bit stage g1. The AND gate 29 takes a logical AND between the inverted signal of the first bit stage g1 and reference clock signal t and outputs the logical ANDed signal to the reset terminal RES of the flip-flop circuit 35 via the two one-shot multivibrators 31, 33. Hence, as shown in FIG. 2(*e*), the reset terminal RES of the flip-flop circuit 35 produces a pulse signal having the pulsewidth tb outputted with a delay of time tb with respect to the times t2, t3, and t5.

The flip-flop circuit 35 operates to invert the output signal of the output terminal Q in synchronization with each rising edge of the reference clock t inputted to the clock terminal thereof CLK and at the same time forms the time series code ADRS as shown in FIG. 2(*f*) with the high-level signal at the output terminal Q changed to a low level. In a time region indicating a code "1" of the signal ADRS, a signal waveform has a period twice (2×ta) the reference clock signal t and has a falling edge at a center between the respective timings. In addition, a period of the signal indicating a code "0" of the signal ADRS is the same as the period ta of the reference clock t and a width thereof during the high level state of the signal becomes equal to the time tb specified by the one-shot multivibrator 31. In this way, the time series code generating means 7 is operated to produce the above-described time series code signal ADRS.

Next, the construction of the synchronizing signal reproducing means 9 will be described in details with reference to FIG. 1(*a*). The synchronizing signal reproducing means 9 comprises a clock/code string reproduction section 37 and intermediate synchronization signal forming section 39.

The clock/code string reproduction section 37 comprises: a one-shot multivibrator 41 connected to the time-series code transmission line 3; an inverter 43 connected to an output terminal of the one-shot mulitvibrator 41; and D-type flip-flop circuit 45 receiving the signal from the above-described time series code transmission line 3 at its data input terminal D with its clock terminal CLK connected to the output terminal of the inverter 43.

When the time series code ADRS is inputted to the one-shot mulitvibrator 41 of the clock/code string reproduction circuit 37, a pulse signal having a pulsewidth tb in synchronization with each rising edge of the signal ADRS is formed as a code string clock signal C shown in FIG. 2(*g*).

In addition, with the code string clock signal C then inverted by means of the inverter 43 and inputted to the clock terminal CLK of the flip-flop circuit 45, the data input terminal D of the flip-flop circuit 45 receives the time series code signal ADRS. Hence, the flip-flop circuit 45 outputs a demodulated signal M substantially in a code string form as shown in FIG. 2(*h*). The signal M is an NRZ (Non-Return to Zero) coded signal whose phase is delayed by the pulsewidth tc of the width modulated signal ADRS 1100 . . . shown in FIG. 2(*f*).

The intermediate synchronization signal forming section 39 comprises a one-shot multivibrator 47 which receives the synchronized code string signal ADRS from the above-described synchronization code string signal transmission line 3 and generates a pulse signal having a pulsewidth td in synchronization with each falling edge of the code string signal ADRS and an AND gate 49 which takes a logical product of the output signal of the one-shot multivibrator 47 and output signal of the inverter 43.

Since the one-shot multivibrator 47 receives the signal ADRS shown in FIG. 2(*f*), the output signal thereof is produced as a signal SG1 shown in FIG. 2(*i*).

The AND gate 49 takes the logical product of the signal SG1 shown in FIG. 2(*i*) and an inverted signal of the signal M shown in FIG. 2(*h*) and outputs an intermediate synchronization signal SG2 in a waveform shown in FIG. 2(*j*). The signal SG2 takes a form in which intermediately rising pulses of the signal SG1 shown in FIG. 2(*i*) are eliminated which are present within the "0" code time slot and has a signal waveform having a rising edge at a center timing position in each time slot of the "1" code of the signal ADRS.

The construction of the data transmission/reception signal forming means 13 shown in FIG. 1(*b*) will next be described below.

The data transmission/reception signal forming means 13 comprises an OR gate 51, a reset/set (RS) flip-flop circuit 53, a data transmission/reception clock 55, and a counter 57, as shown in FIG. 1(*b*).

The OR gate 51 receives the above-described code string clock signal C and output signal SG2 from the AND gate 49 and outputs a combined signal DSY shown in FIG. 2(*k*).

The flip-flop circuit 53 in response to the combined signal DSY at its set terminal S outputs a transmission command signal SG3 at its Q output terminal. In addition, the signal SG3 serves as a count start signal of the counter 57 outputting a stop signal SG4 (not shown in FIGS. 2(*a*) through 2(*n*)) to the reset terminal R of the flip-flop circuit 53 when the clock 55 repeatedly outputs a signal Dc having a substantially predetermined frequency eight times.

Hence, if the intermediate synchronization signal DSY as shown in FIG. 2(*k*) is received at the set terminal S of the flip-flop circuit 53, the clock 55 outputs a data transmission/reception synchronization signal Dc in units of eight times as shown in FIG. 2(*n*) for a time duration of Δt. In addition, the clock 55 stops after the counter 55 counts a predetermined number, i.e., eight.

As shown in FIG. 2(*n*), in the time slot (period) of code "1" a halt portion is provided at a substantially center position of the time slot for taking a twice synchronization at the center position on the 16-bit data, i.e., for correcting the deviated clock frequency of the clock 55, so that data transmission/reception synchronization signals are outputted from the clock 55 twice by eight clock bits.

A construction of the code string pattern detecting means 11 will next be described with reference to FIGS. 1(*a*) and 1(*b*):

The code string pattern detecting means 11 is provided with a code string detecting section 59 and gate control section 61.

The code string pattern detecting section 59 comprises a shift register 63 and latch 65.

The gate control section 61 comprises a gate controlling memory 67 and main gate controlling latch 69. It should be noted that the gate controlling memory 67 includes an address storage 67*a* and control signal storage 67*b*.

The shift register 63 shifts the code string modulated signal M sequentially inputted to a leftmost bit stage thereof as viewed from FIG. 1(*b*) to a right-side bit stage thereof in synchronization with the clock signal C and detects such seven kinds of code string pattern as 110, 111, 011, . . . shown in FIG. 2(*m*).

the address storage 67*a* previously stores predetermined bits constituting addresses. The control signal storage 67*b*, in turn, previously stores gate control states to control gate states corresponding to these specified addresses. The control signal storage 67*b* has a two-bit parallel construction, a first bit portion G1 thereof storing a bit status indicating whether either data transmission or reception corresponding to the specified address is carried out or not, i.e., when the bit status thereat is 1, either data transmission or reception is to be carried out and, on the other hand, when the bit status is 0, neither data transmission nor reception is carried out. It is noted that since, when the first bit portion G1 is 0, neither data transmission nor data reception in the data station is carried out, it is not necessary to store a bit status in a second bit portion G2 (i.e., second bit portion G2 indicates indefinite).

The latch circuit 69 latches the status signal "1" of the first bit portion G1 in synchronization with the current rising edge of the above-described code string signal C when one of the code string patterns detected by the shift register 63 accords with one of the addresses stored in the above-described address storage 67*a*, outputs a latch signal L1 having a high level on the subsequent rising edge of the code string clock signal C, and maintains the latch signal L1 until the subsequent rise of the clock signal C is received. It sould be noted that the second bit portion G2 outputs a signal $L_2$ having a high level when the bit status thereof is at a "1" and a low level when the bit status if at a "0".

The latch circuit 65 latches the current logic pattern of the shift register 63 in response to the receipt of the above-described latch signal L1. Each signal formed in the code string pattern detecting means 11 is applied to other circuits to be described later.

The gate section 71 comprises a latch circuit 75; a main gate circuit 77; a transmission gate 79; a reception gate 81; and an inverter 83.

The main gate circuit 77 receives the latch signal L1 and opens the gate thereof when the signal L1 is turned to a high level.

On the other hand, the inverter 83 is intervened between each control gate of the transmission and reception gates 79, 81 so that the open and close operations of the transmission and reception gates 79, 81 are carried out such that one is open and the other is closed and vice versa.

In details, when the signal L2 inputted to the latch circuit 75 is at a high level, the transmission gate 79 is open and the reception gate 81 is closed and when the signal L2 is at a low level, the reception gate 81 is open and the reception gate 79 is closed.

The transmission/reception section 73 comprises a data transmission portion 73T and data reception portion 73R.

The transmission portion 73T comprises: a parallel-to-serial converter 85 which receives the above-described data transmission/reception enable clock signal Dc, converts a parallel signal into a serial data in the NRZ (Non Return to Zero) method, and sends the serial data to the transmission gate 79; and a data output memory 87 having address storage portions 87a and output data storage portions 87*b* storing data to be outputted, each stored data corresponding to one of the addresses stored in the storage portions 87*b* stores the input signals form an input processing circuit 89 as an information of 16 bits or 8 bits corresponding to each predetermined address. A parity bit can be added to such an information of 16 bits or 8 bits.

When the code string pattern latched in the latch 65 of the above-described code string pattern detecting section 59 accords with one of the addresses stored in the address storage portion 87*a*, the parallel-to-serial converter 85 (P/S CON.) inputs 16-bit or 8-bit data stored in any one of the output data storage portions 87*b* whose position corresponds to the above-described address storage portion 87*a*, and outputs the parallel-to-serial converted data sequentially to the data transmission line 5 via the transmission gate 79 and main gate 77. It should be noted that in this embodiment data stored in the output data storage portions 87*b* comprises 16 bits in the addresses 110, 001, 010, and 101 and 8 bits in the addresses 111, 011, and 100. Such a restriction is caused by a time width defining code string signal of 1 which is twice the time width defining code string signal of 0.

The reception section 74R, on the other hand, comprises: a serial-to-parallel converter 91 (S/P CON.) which receives a 16-bit or 8-bit serial data via the reception gate 81 in synchronization with the above-described data transmission/reception signal Dc and converts the serial data in the NRZ code into a parallel data; and a received data memory 93 which stores the parallel data from the serial-to-parallel converter 91 into a storage position in an address specified by the above-described latch 65.

The received data memory 93 comprises address setting portions 93*a* and data storage portions 93*b*. The data stored in one of the data storage portions 93*b* is outputted to an output processing circuit 95 in which a predetermined processing is carried out.

The construction of the network system is as described hereinabove.

A detailed description of an action of an intermediate correction for the data transmission/reception enable clock signal when the 16-bit data is to be transmitted will be made below.

Suppose now that one of the code string patterns, e.g., 110 appears on the shift register 63 of the code string pattern detecting means 11 at a time t0 shown in FIGS. 2(*a*) through 2(*n*).

Suppose that the code string pattern 110 accords with any one of a code indicating addresses, i.e., 110 stored in the address storage portions 67*a* and that two bit status 1,1 is written into one of the control signal storage portions 67*b* corresponding to the specified address 110.

At this time, the latch 69 latches the status 1 of the first bit G1 of the control signal storage portion 67*b*, outputs a high-level signal at a next time t1 shown in FIGS. 2(*a*) through 2(*n*), i.e., at the time t1 when the next code string clock signal C rises, opens the main gate 77 until a time t2 is reached at which the code string clock signal C again rises, and outputs the above-described high-level signal to the latch 65.

The latch 65 latches the above-described code string pattern 110 of the shift register 63 in response to the high-level state of the signal L1, and holds its string pattern between the times t1 and t2 shown in FIGS. 2(*a*) through 2(*n*).

In addition, since, at this time, "1" is written into the second bit portion G2 of the control signal storage portion 67*b* and the bit status of 1 indicates that it is the time for the data transmittable state, the latch circuit 75 outputs a high-level signal and operates so that the transmission gate 79 is opened between the times t1 and t2 and reception gate 81 is closed therebetween. The set terminal S of the flip-flop circuit 53 in the data transmission/reception signal forming means 13 receives the data transmission/reception synchronizing signal DSY shown in FIG. 2(*k*) and outputs the data transmission/reception enable clock signal Dc shown in FIG. 2(*n*) between the times t1 and t2 from the output terminal of the clock 55.

The enable clock signal Dc oscillates eight times with the predetermined frequency in synchronization with the time t1, halted for a while, is synchronized at an intermediate time t1' between the times t1 and t2, and is again oscillated eight times in synchronization with the time t1', as shown in FIG. 2(*n*).

Hence, the parallel-to-serial converter 85 outputs 16-bit data in the NRZ code corresponding to the address 110 of the data outputting memory 87 in such a way that first eight bits of the 16-bit data is outputted from the time t1 and next remaining eight bits thereof is subsequently outputted from the time t1' in the NRZ code. The 16-bit data is thus sent to the data transmission line 5 via the gate 79, and main gate 77 from the parallel-to-serial converter 85 and is received by a corresponding data receiver (not shown).

On the other hand, reception of data is carried out as follows.

Suppose not that, for example, an address 010 is allocated to one of the address storage portions 67*a* of the code string pattern detecting means 11 and one of the address storage portions 93*a* of the reception portion 73R. In addition, suppose that the code string pattern 010 appears on the shift register 63. The main gate 77 and reception gate 81 are opened between the times t6 and t7 shown in FIGS. 2(*a*) through 2(*n*) in the same way as the case of data transmission and the 16-bit data is inputted twice by eight bits to the serial-to-parallel converter 91 via the data transmission line 5, main gate 77, and reception gate 81 from a corresponding data transmitter (not shown).

The parallel-to-serial converter 91 inputs the 16-bit data twice by eight bits in synchronization with the data transmission/reception enable clock signal Dc.

As described above, since, in the data transmission and reception, data comprising a plurality of bits (sixteen bits) is divided into a number of bits (in this embodiment, eight bits) which is negligible for an error caused by data transmission and reception clock 55 and synchronization is taken at the head portion of the divided data, a synchronization deviation between the 16-bit data transmission and reception will not occur.

It should be noted that although in the description on the first preferred embodiment data transmission/reception of 16-bit or 8-bit data is exemplified, data of other numbers of bits, e.g., 8-bit or 4-bit data, or 32-bit or 16-bit data may alternatively be transmitted or received.

In addition, although, in the above-described embodiment, the intermediate synchronization signal is taken at an intermediate position of one code whose period (time slot) is set twice of a reference period which corresponds to the period of the above-described reference clock pulse train and which is taken as the period of the other code, the form of the intermediate synchronization is not limited. For example, with the period of the one code being a multiplication of the period of the other code by a number other than two, the predetermined intermediately synchronized signal can be obtained at a plurality of intermediate points in the state of the one code.

Figure 3:
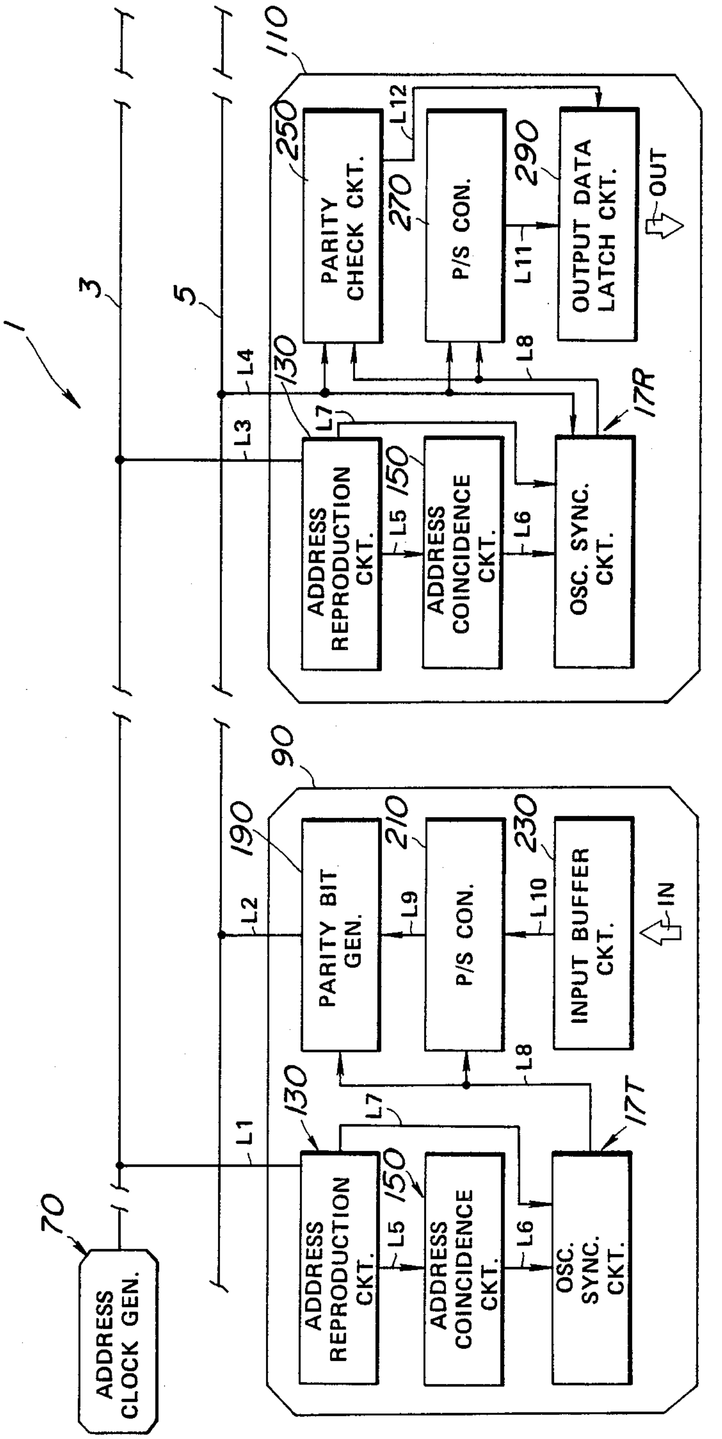
FIG. 3 is a circuit block diagram of a network system of a second preferred embodiment according to the present invention.

FIG. 3 shows a part of network system 1 commonly used in second and third preferred embodiments.

In FIG. 3, the network system 1 includes the address clock line (time series code transmission line) 3 and the data line (data transmission line) 5.

The address clock generator (time series code generating means) 7 is connected to the address clock line 3. A data transmitter 90 is connected to the address clock line 3 via a circuit path L1 and to the data line 5 via a circuit path L2. Similarly, a data receiver 110 is connected to the address clock line 3 via a circuit path L3 and to the data line 5 via a circuit path L4. Although in FIG. 3 one data transmitter and one data receiver are shown, suitable numbers of data transmitters and receivers are connected to these lines 3, 5. A predetermined address is allocated to each of the data transmitters and receivers so that data transfer is carried out between the data transmitter and receiver each having the same predetermined address.

The data transmitter 90 comprises: (a) an address reproduction circuit 130 (code string pattern detecting means) connected to the address clock line 3 via the circuit path L1; (b) an address coincidence circuit (pattern/code string collating means) 150 connected to the address reproduction circuit 130 via a circuit path L5; (c) an oscillation/synchronization circuit (data transmission/reception enable clock signal forming means) 17T connected to the address coincidence circuit 150 via a circuit path L6 and to the address reproduction circuit 130 via a circuit path L7; (d) a parity bit generating circuit 190 connected to the oscillation/synchronization circuit 17T via a circuit path L8 and to the data line 5 via the circuit path L2; a parallel-to-serial converting circuit 210 connected to the circuit path L8 and to the parity bit generating circuit 190 via a circuit path 29; and (e) an input buffer circuit 230 connected to the parallel-to-serial converting circuit 210 via a circuit path L10.

The parity bit generator 190, parallel-to-serial converting circuit 210, and input buffer circuit 230 constitute data transmitting means.

The data receiver 110, on the other hand, comprises the address reproduction circuit 130, address coincidence circuit 150, oscillation/synchronization circuit 17R, in the same way as the data transmitting means, and receiving means constituted by a parity check circuit 250, a serial-to-parallel converting circuit 270, and an output data latch circuit 290. The serial-to-parallel converting circuit 270 is connected to the output data latch circuit 290 via the circuit path L11 and parity check circuit 250 is connected to the output data latch circuit 290 via the circuit path L12.

It is noted that an arrow mark with a symbol IN denotes a data input circuit path from an encoder circuit (not shown) and an arrow mark with a symbol OUT denotes an data output circuit path of transmission data.

For the stream of data in the network system, the detailed description thereof will be made at the last stage of the second preferred embodiment.

FIG. 4 shows an internal circuit of the address clock generator 70 shown in FIG. 3 used in the second preferred embodiment.

FIGS. 5(*a*) through 5(*d*) show signal states in internal circuits of the address clock generator 70 in FIG. 4.

The address clock generator 70 comprises: (a) a reference clock generator 310 which produces a reference clock signal S3 having a predetermined constant period T as shown in FIG. 5(*c*); (b) an M-series code signal generator 330 which in response to the clock signal S3 from the reference clock generator 310, produces an M-series code signal S3 shown in FIG. 5(*a*); and a pulse generator 350 which produces a pulse train signal S2 having a pulsewidth Δt shown in FIG. 5(*b*). The reference clock signal S3 has a period T and a duty factor of 50%. The M-series code signal generator 33 includes a multi-stage shift register and Exclusive-OR gate and outputs codes of "1" and "0" on the basis of the above-described clock signal S3 in a fifth-order M-series code as the code string signal S1 in the time sequency mode. The M-series code signal generator 330 outputs the fifth-order M-series code for each period thereof sequentially as follows: 0000101011101100011111001101001. The five-order M-series code can be derived from a five-bit shift register and Exclusive-OR gate in the similar way as described in the first preferred embodiment . The pulse generator 350 includes one-shot multivibrator synchronized with a rising edge of the input signal and outputting a signal having a time width Δt and produces a pulse signal S2 having a pulsewidth Δt and a period T/2 in synchronization with each of the rising and falling edges of the reference clock signal S3.

The address clock generator 70 furthermore includes a switching gate circuitry 370.

The switching gate circuitry 370 comprises: an inverter 390 which inverts the code string signal S1 in the M series code; an AND gate 410 which receives the inverted code string signal from the inverter 390 and pulse signal S2 from the pulse generator 350; an AND gate 430 which receives the reference clock signal S3 from the reference clock generator 310 and code signal S1 from the M series code signal generator 350; and OR gate 450 which receives the output of the AND gate 430 and the output AND signal of the AND gate 41. The switching gate circuitry 370 switches the input three signals S1, S2, and S3 at predetermined timings and outputs the address clock signal S4 shown in FIG. 5(*d*) to the address clock line 3.

The address clock signal S4 is a signal in such a form that the pulse signal during the code 0 formed at the AND gate 410 and reference clock cignal during the code 1 formed at the AND gate 430 are superposed by means of the OR gate 450 and in such a form as the time series code to which a signal for obtaining a synchronization signal for an intermediate correction to be described later is added.

FIG. 6 shows an internal circuit of the address reproduction circuit 130 in the second preferred embodiment. FIGS. 7(*a*) through 7(*i*) show output signal states of respective internal circuits of the address reproduction circuit 130 shown in FIG. 6. It should be noted that the timing charts of FIGS. 5(*a*) through 5(*d*) and FIGS. 7(*a*) through 7(*i*) show only part of time slots in the five-order M-series code string.

The address reproduction circuit 130 comprises: (a) an integrator 470 including a resistor 47*a*, a capacitor 47*b*, and a diode 47*c*; (b) three flip-flop circuits 490, 510, and 530; (c) three logic circuits 550, 570, and 590; and (d) a shift register 610.

It should be noted that symbol τ located at one input terminal of each logic gate 55, 57, and 59 denotes a delay circuit including, as shown in FIG. 6, a resistor and a capacitor whose one terminal is grounded for delaying a phase for a minute time.

In addition, the circuit path L1 connected to the above-described address clock transmission line 3 is connected to (a) a clock input terminal of the flip-flop circuit 490; (b) a cathode terminal of the diode 47*c* constituting the integrator 470 and the resistor 47*a* constituting the same; (c) one input terminal of an Exclusive-OR gate 550 and the other input terminal thereof via the delay circuit τ; and (d) a clock input terminal of the flip-flop circuit 530.

An anode terminal of the diode 47*c*, the other terminal of the resistor 47*a*, and another terminal of the capacitor 47*b* whose one terminal is grounded are connected together and are also connected to data input terminals D of the two flip-flop circuits 490, 510. The output terminal of the Exclusive OR gate 550 is connected to the clock input terminal CK of the flip-flop circuit 510. The output terminal Q of the flip-flop circuit 510 is connected directly to the one input terminal of the logic gate 570 and to the other input terminal (inhibit terminal) of the logic gate 57 via the delay circuit τ. The output terminal of the logic gate 570 is connected to a data input terminal R of the flip-flop circuit 530. The output terminal Q of the flip-flop circuit 530 is connected to each clock input terminal CK of the shift register 610, a first bit portion of the shift register 610 connected to the output terminal Q of the flip-flop circuit 490. Each bit portion of the shift register 610 is connected to the circuit path L5 as also shown in FIG. 3. Furthermore, the output terminal Q of the flip-flop circuit 530 is connected directly to one input terminal (inhibit terminal) of the logic gate 590 and indirectly to the other input terminal thereof via the delay circuit τ. The output terminal of the logic gate 590 is connected to the circuit path L7.

Since in the above-identified address reproduction circuit 130 the address clock signal S4 (refer to FIG. 7

(*a*)) received from the circuit path L1 is integrated by means of the integrator 470, the output signal waveform thereof is an intermittent triangular wave S5, the level of which is increased at a gradient during the code of 1 of the address clock signal S4, as shown in FIG. 7(*b*). On the other hand, the output waveform of the output terminal Q of the flip-flop circuit 49 which receives the triangular wave signal S5 at the data input terminal D and receives the address clock signal S4 at the clock input terminal CK thereof indicates a signal S6 having a high livel at a time when an apex of the triangular waveform is received at the data input terminal D, i.e., a center point of the code of 1 of the address clock signal S4 and which continues until the falling edge of the subsequent coming pulse of the address clock signal S4, as shown in FIG. 7(*c*).

Since the two input terminals of the Exclusive-OR gate 550 receive directly the address clock signal S4 and a delayed signal of the address clock signal S4 by a minute time by means of the delay circuit $\tau$, the output signal S7 of the Exclusive-OR gate 550 takes a form of sharp pulse having a high level only for the minute time at a time when these input signals have mutually different levels, i.e., when either rising or falling edge of the address clock signal S4, as shown in FIG. 7(*d*).

Since the data input terminal D of the flip-flop circuit 510 receives the output signal S5 of the integrator 470 and the clock terminal CK thereof receives the output signal S7 of the Exclusive-OR gate 550, the output signal of the flip-flop circuit 510 is a signal S8 having a high level during a time from the apex of the triangle of the triangular wave signal S5 to the appearance of the subsequent sharp pulse S7, as shown in FIG. 7(*e*). The signal S8 has a duty factor of 50% and has a rising edge at the center of the code of 1 of the address clock signal.

Since the one input terminal of the logic gate 570 receives directly the output signal S8 of the flip-flop circuit 510 and the other input terminal (having an inverter) thereof receives the signal S8 via the delay circuit $\tau$, the output signal S9 of the logic circuit 570 is a pulse formed signal having a high level only for a minute time at $\Delta t$ determined by the delay circuit $\tau$ at a time when the signal S8 shown in FIG. 7(*e*) rises, as shown in FIG. 7(*f*).

Since the reset terminal R of the flip-flop circuit 530 receives the above-described signal S9 from the AND gate 570 and the clock input terminal CK of the flip-flop circuit 530 receives the address clock signal S4, the output signal of the flip-flop circuit 530 having alternatingly different levels at each rising edge of the address clock signal S4 received at the clock input terminal CK when the code of the address clock signal is at a "0" and having a level conversion at a substantially center position between the times (time slot) when the code of the address clock signal is at a "1" (corresponds to the pulse formed wave of duty factor of 50 percents) so that the demodulation signal of the reference clock signal S3 is formed as shown in FIG. 7(*g*).

Since the one input terminal having the inverter of the logic gate 59 receives directly the demodulation signal S10 via the delay circuit $\tau$, the output signal S11 of the logic gate 590 is in such a waveform having a sharp pulse having a time width determined by the delay circuit $\tau$ at the falling edge of the signal S10 as shown in FIG. 7(*h*). The signal S11 is a synchronization signal for carrying out an intermediate correction to be described later synchronized at an intermediate position of the period T of each code of the address clock signal S4.

Since the data input terminal D of the first bit stage of the shift register 610 receives the demodulation signal S6 in the above-described code string and each clock input terminal CK of the shift register 610 receives the demodulation signal S10 of the reference clock signal, the demodulation signal S6 in the code string synchronized with each rising edge of the signal S10 as the clock input signal of the shift register 61 is read and shifted toward the right side sequentially in FIG. 6. If the code string is, e.g., the five-order M series code and the shift register 610 comprises a five-bit shift register, the shift register 610 produces a five-bit code string pattern as shown in FIG. 7(*i*) at a head of each time slot of the address clock signal S4, i.e., a head of each time slot of the demodulated clock signal S10. It should be noted that the number n of bit stages of the shift register 610 is arbitrary in the five-order M series code string.

In this way, the address reproduction circuit 130 shown in FIG. 6 outputs the immediately preceding contents of the five-bit code string patterns 00100, 00010, 00001, . . . , for each time slot as shown in FIG. 7(*i*) at the circuit path L5 and the synchronization signal S11 for the intermediate correction shown in FIG. 7(*h*) at the circuit path L7.

The address coincidence circuit 150 shown in FIG. 3 collates the five-digit code string patterns 00100, 00010, . . . , on the parallel outputs of the shift register 610 to a five-digit address allocated thereto. If they coincide with each other, the address coincidence circuit 150 outputs an address coincidence signal S12 (refer to FIG. 10(*a*)) having a high-level duration extending from the next rising time of the demodulation clock signal S10 to the next and next rising time of the demodulation clock signal S10.

The time width T of the high level duration of the signal S12 is the same as the time slot T shown in FIG. 5(*a*).

Figure 8:
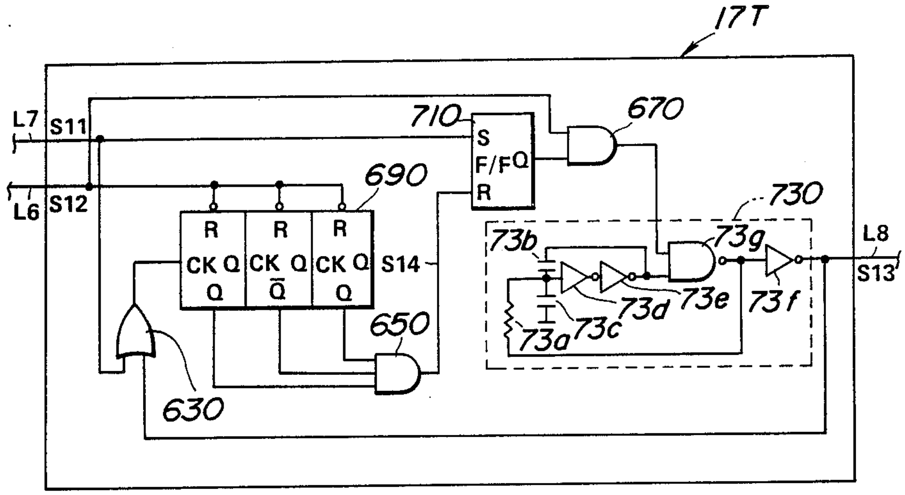
FIG. 8 is an internal circuit block diagram of an oscillation synchronizing circuit 17T arranged in each data transmitter used in the second and third preferred embodiments.

FIG. 8 shows a circuit block diagram of the oscillation/synchronization circuit 17T installed in the data transmitter 90.

Figure 9:
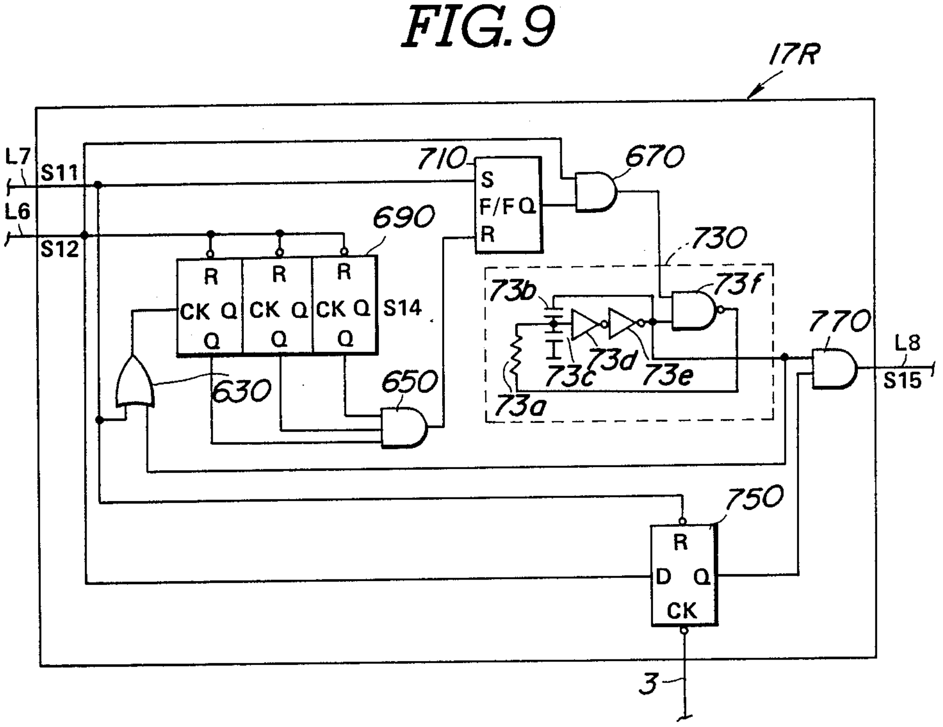
FIG. 9 is an internal circuit block diagram of an oscillation synchornizing circuit 17R arranged in each data receiver used in the second and third preferred embodiments.

FIGS. 10(*a*) through 10(*g*) show timing charts indicating respective signal states of the circuits shown in FIGS. 8 and 9.

The oscillation/synchronization circuit 17T forms a synchronization signal when data transmission means to be described later outputs data in the NRZ code. The oscillation/synchronization circuit 17T comprises: three logic gates 630, 650, and 670; a counter 690 constituted by three flip-flop circuits; a reset-set flip-flop circuit 710 taking a higher priority for set; and an oscillator 730 enclosed by a dot line.

The oscillator 730 comprises: a resistor 73*a;* two capacitors 73*b,* 73*c;* and a NAND gate 73*g.*

When a high-level signal appears at one input terminal of the NAND gate 73*g,* a pulse train signal having a predetermined frequency is outputted at the output terminal of the inverter 73*e.*

The synchronization signal S11 for the intermediate correction received via the circuit path L7 shown in FIG. 8 is inputted to a set terminal S of the flip-flop circuit 710 and one input terminal of an OR gate 630. On the other hand, the address coincidence signal S12 received via the circuit path L6 is inputted to each reset terminal R of the counter 690 and one input terminal of the AND gate 670.

Suppose that the address coincidence signal S12 is initially at a low level and the output terminal Q of the flip-flop circuit 710 is at a high level. When the high-level address coincidence signal S12 shown in FIG. 10(*a*) is inputted to the AND gate 67, the AND gate 67 outputs a high-level signal and provides the high-level signal for the one input terminal of the NAND gate 73*g*.

At this time, the oscillator 730 starts oscillation and outputs the transmission enable clock signal S13 shown in FIG. 10(*b*) to the circuit path L8. It should be noted that at this time if the transmission data has eleven bits including a start bit and parity bit, these data is transmitted in the NRZ code sequentially from the head bit in synchronization with the falling edge of the above-described transmission enable clock signal S13 via transmitting means. The transmitting means, as shown in FIG. 3, comprises: a parity bit generator 190; and parallel-to-serial converter 210.

On the other hand, since the above-described counter 690 receives the above-described transmission enable clock signal S13 via the OR gate 630 at its clock input terminal CK, the counter 690 counts the number of the transmission enable clock signal S13 in synchronization with each rising edge of the transmission clock enable signal S13. When the count value of the counter 690 reaches 5; i.e., the contents of the counter 690 indicate such a pattern as "101" in the bit array shown in FIG. 8, a transmission halt signal S14 having a high level shown in FIG. 10(*c*) is outputted from the AND gate 650 and resets the flip-flop circuit 710. Consequently, a signal having a low level is outputted to the AND gate 670 and to the NAND gate 73*g* to halt the oscillation of the oscillator 730. Therefore, the transmission of 11-bit data is temporarily halted when the first 5-bit data transmission is carried out.

Next, since the OR gate 630 thereafter receives the synchronization signal S11 for the intermediate correction (refer to FIG. 7(*h*) and also shown in FIG. 10(*f*)) from the circuit path L7, the counter 690 counts up only by one and the output signal S14 of the AND gate 650 is returned again to a low level. Since the synchronization signal S11 for the intermediate correction is inputted to the set terminal S of the flip-flop circuit 710, the flip-flop circuit 710 is set and outputs the high level signal to the one input terminal of the AND gate 670.

Since, at this time, the other input terminal of the AND gate 670 receives the address coincidence signal having the currently high level, the AND gate 67 outputs the high-level signal.

Hence, the oscillator 730 starts oscillation again in synchronization with the signal S11 shown in FIG. 10(*f*), as shown in FIG. 10(*b*). The transmission enable clock signal S13 shown in FIG. 10(*b*) is outputted from the circuit path L8 and the transmission of the next remaining six bits including the parity and END bits is again carried out in synchronization with each falling edge of the transmission clock signal $S_{13}$. It is noted that the transmission status DB of data bit in the data transmission/reception is shown in FIG. 10(*g*).

FIG. 9 shows an oscillation/synchronization circuit 17R of the data receiver 110.

The oscillation/synchronization circuit 17R of the receiver 110 comprises a flip-flop circuit 750, and AND gate 770. A data input terminal D of the flip-flop circuit 750 is connected to the circuit path L6, a reset terminal R thereof to the circuit path L7, a clock terminal CK thereof to the address clock transmission line 3, and output terminal Q thereof to the one input terminal of the AND gate 770. The other one input terminal of the AND gate 770 is connected to an output terminal of the above-described oscillator 730 and output terminal thereof is connected to the circuit path L8.

The oscillator 730 starts oscillation in response to the address coincidence signal S12 in the same way as the oscillator 730 shown in FIG. 8.

Since the address coincidence signal S12 is initially at a low level, the output terminal Q of the flip-flop circuit 750 is reset in the low level state. Hence, in the oscillation/synchronization circuit 17R shown in FIG. 9, the clock signal of an oscillator 730 does not output at the first time but outputs the clock signal after the reception of the start bit, i.e., "start" signal of data DB shown in FIG. 10(*g*).

Then, the data shown in FIG. 10(*g*) is received by receiving means, as shown in FIG. 3, comprising: the parity check circuit 250; the serial-to-parallel converter 270; and output data latch circuit 290.

An action of the clock stop signal S14 shown in FIG. 9 is the same as that shown in FIG. 8. That is to say, when the contents of the counter 690 indicates 5, i.e., 101, a stop signal is sent to the oscillator 730 and thus the oscillator 730 stops.

Then, when the synchronization signal S11 for the intermediate correction is inputted to the oscillator 730 via the circuit path $L_7$, the oscillation is again started in the same way as shown in FIG. 8. This means that even if the phase deviation occurs in the fifth bit of the receiving signal, the deviation does not continue to the sixth bit of the receiving signal. In other words, the clock used for receiving data, i.e., the function of oscillator 730 is forcibly corrected.

The receiving means in response to the receiving signal S15 shown in FIG. 10(*d*) receives the data comprising the sixth bit and the subsequently carried bits sequentially on each rising edge of the enable clock signal S15 and after the parity bit of the tenth bit position is received, the data reception is ended on the rising edge of the END bit of the received data, i.e., within the high-level of the signal $S_{12}$.

The data receiver 110 shown in FIG. 3 carries out the parity check via the parity check circuit 250 on the basis of the receiving signal outputted in this way from the oscillation/synchronization circuit 17R, carries out the serial-to-parallel conversion of the serial data in the NRZ code received via the serial-to-parallel conversion circuit 270, latches the received data by means of the latch circuit 290, sends the data to a receiving signal processing circuit (data input port) not shown via the data output circuit path OUT, the receiving signal processing circuit executing a predetermined processing, e.g., vehicle headlight turning on and actuating a predetermined actuator.

Since in the second preferred embodiment shown in FIG. 3 through FIG. 10, the intermediate correction of the data transmitting/receiving enable clock (oscillator) can be carried out by means of the synchronization signal for the intermediate correction with the 11-bit data divided into two of five-bit and six-bit data, the 11-bit data can smoothly be transmitted without the phase deviation with respect to that of its corresponding receiver.

FIGS. 11 through FIG. 14(*f*) show a third preferred embodiment in which an arbitrary number of the synchronization signal pulse for the intermediate correction can be obtained by an arbitrary number within each time slot.

Since in the third embodiment, the internal circuits of the address clock generator 70 and address reproduction circuit 130 are only different from those in the second embodiment, the oscillation/synchronization circuits 17T, 17R shown in FIGS. 8 and 9 can well be applied to the third embodiment as well as the overall drawing of FIG. 3.

It should also be noted that in the third embodiment the third-order M series code is used.

FIG. 11 shows another example of the address clock generator 70 used in the third embodiment. FIGS. 12(*a*) through 12(*h*) show timing charts of signal states of internal circuits shown in FIG. 11.

The address clock generator 70 comprises: a reference clock generator 790 which generates a reference clock signal S16 shown in FIG. 12(*a*); and a divider 810 which divides the frequency of the reference clock signal into ½, ¼, and ⅛ as shown in FIGS. 12(*b*), 12(*c*), and 12(*d*).

In addition, the address clock generator 70 further comprises OR and AND gates, 830, 850 which inputs the output signals S17, S18 of the first and second frequency-division stages of the divider 810 and outputs signals S20, S21 and an M-series code signal generator 870 which receives the output signal S19 shown in FIG. 12(*d*) from the output terminal of the third frequency division stage of the divider 810 and produces the third-order M-series code signal S22 for each frequency period T. The address clock generator 70 further comprises: an AND gate 890 receiving signals S22 and S20; an AND gate 930 whose one input terminal receives the signal S22 via an inverter 910 and other input terminal receives the signal S21; and OR gate 950 which receives the output signals of these AND gates 890, 910 and outputs the address clock signal S23 to the address clock line 3. The AND gate 890, inverter 910, AND gate 930, and OR gate 950 constitute a switching gate circuit 970.

The OR gate 830 outputs a signal S20 having a wide high level duration of period T/2 as shown in FIG. 12(*e*) in response to the divided clock signals S17, S18.

The AND gate 850 outputs a signal S21 having a wide low level duration of period T/2 as shown in FIG. 12(*f*).

Since the AND gate 890 receives the M-series code signal S22 shown in FIG. 12(*g*) and the signal S20, the output signal thereof is such that it is turned to a low level in a region in which the code of the M-series signal S22 is 0 and forms directly the status of the signal S20 in a region in which the code of the M-series signal is 1. On the other hand, since the AND gate 930 receives the inverted signal of the M-series code signal S22 shown in FIG. 12(*g*) and the signal S21, the output signal thereof is formed in such a way that it is turned to a low level in a region in which the code of the M series signal S22 is 1 and the AND gate 930 outputs directly the status of signal S20 in a region in which the code is 0. Hence, the address clock signal outputted from the OR gate 950 is such as the signal S20 having a wide high-level duration when the M series code is 0 and the signal S23 having a wide low level duration when the M series code is 1.

Figures 14A, 14B, 14C, 14D, 14E, 14F:
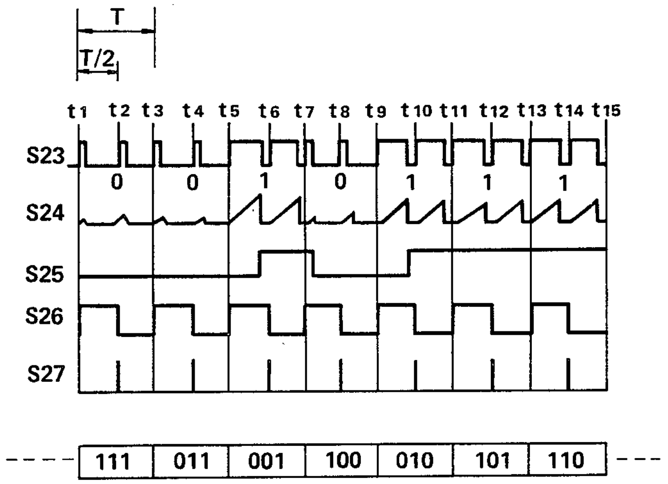
FIGS. 14(*a*) through 14(*f*) are timing charts of output signals of respective circuits shown in FIG. 13.

FIG. 13 shows another example of the address reproduction circuit 130 in the third preferred embodiment. FIGS. 14(*a*) through 14(*f*) show timing charts indicating signal states of respective internal circuits of the address reproduction circuit 130.

The address reproduction circuit 130 comprises: an integrator 470; flip-flop circuit 490; a shift register **61*a*; a six-bit shift register 990 which receives the output signal S25 of the flip-flop circuit 490 and shifts the signal S25 toward the left side as viewed from FIG. 13 in synchronization with the address clock signal S23; three Exclusive-OR gates 101, 103, and 105 which receive an output signal of each bit portion (1) through (6) of the shift register 990; a NOR gate 107 which receives the output signals of these Exclusive-OR gates 101, 103, and 105; and an AND gate 111 whose one input terminal receives the synchronization signal S27 for the intermediate correction via the delay circuit τ and other input terminal receives the synchronization signal S26 via an inverter attached thereto. Each clock input terminal of the shift register 990 receives the output signal S26 of the NOR gate 107**.

Since the three-order M series code is used in the third preferred embodiment, the bit number of the shift register **61*a* is three bits. The address clock signal S23 is shown in FIG. 14**(*a*). This signal S23 is converted into a signal shown in FIG. 14(*b*) via the integrator 470. Since the signal S24 is read into the flip-flop circuit 490 on each rising edge of the address clock signal S23, the output signal of the flip-flop circuit 490 is a demodulated signal S25 in the code string in which the two states of codes 1 and 0 are read twice at a time a little before an intermediate point of each time slot of the data clock signal and at a time of the end of each time slot thereof. It is noted that the little time before the intermediate point means the period Δt of the reference clock S16 shown in FIG. 12(*a*).

The shift register 990 reads the demodulated signal S25 of the above-described code string at each rising edge of the address clock signal S23. That is to say, the same signal is read twice at each time slot. Hence, the contents of the 6-bit shift register 990 at each time are as follows.

t6→000 001
t7→000 011
t8→000 110
t9→001 100
t10→011 001
t11→110 011
t12→100 111

As shown above, at the time, e.g., t6, the contents of the shift register 990 indicates 000 001 and at the time t7 the contents thereof indicates 000 011. At this time, the output combination pattern of the Exclusive-OR gates 101, 103, and 105 indicates 001 at the time t6 and 000 at the time t7.

In this way, the output signals of the three Exclusive-OR gates 101, 103, and 105 repeat coincidnece and non-coincidence for each time of T/2-period. Thus, the NOR gate 107 outputs the demodulation signal S26 shown in FIG. 14(*d*) of the clock signal S19 shown in FIG. 12(*d*), i.e., the level of signal inverted for each perioed of T/2.

The AND gate 111 which receives the signal S26 via the delay circuit τ at one input terminal and via an inverter at the other input terminal and outputs a signal S27 having a pulsewidth determined by the delay circuit τ at the center point of each time slot of the code to the circuit path L7. It is noted that the signal S27 is the same kind of the synchronization signal for the intermediate correction described in the second preferred embodiment with reference to FIG. 7(*h*).

It should also be noted that the output signal S26 of the NOR gate 107 is inputted into each clock input terminal of the shift register **61*a* and the modulation signal S25 of the address clock signal shown in FIG. 14**(*c*) is sequentially read into the shift register 61*a*. The contents of the shift register 61*a* at each time slot T is shown in FIG. 14(*f*).

The action of the synchronization signal for the intermediate correction in the third embodiment is the same as that described in the second embodiment. In the same way as described with reference to FIG. 8 through FIG. 10, the intermediate correction of the oscillator 730 is carried out, so that the eleven-bit data can be transmitted in the NRZ code twice by five bits and six bits.

Although the number of bits in the shift register 990 is six stages as described in the third preferred embodiment, in the n-order M-series code signal the number of bits is in general 2n stages.

In addition, if the number of the rising edges in the zero code of the code string signal shown in FIG. 14(*a*) and the number of the falling edges in the one code of the code string signal are suitably selected, the demodulation signal S26 can provide the synchronization signal for the intermediate correction of the same kind as shown in FIG. 14(*e*) within the individual time slots by a suitable number. To achieve this, the signals S20, S21 shown in FIGS. 12(*e*) and 12(*d*) must be appropriate. However, this can easily be carried out by suitably selecting the number of division stages of the divider 810 and by outputting a signal inverted for each period of T/3 or T/4 at the NOR gate 107 of the address reproduction circuit 130.

In this way, if the synchronization signal S27 for the intermediate correction shown in FIG. 14(*e*) is produced for one-third of each time slot or for one-fourth thereof, the data having a plurality of bits according to the accuracy of the oscillator 730 shown in FIGS. 8 and 9 are divided into a group of predetermined bit numbers and the data transmission in the NRZ code can be carried out without the synchronization deviation.

As described hereinabove, in the network system according to the present invention the synchronization signal is produced at an intermediate position of one of the codes whose period is longer than the other code and an intermediate correction of a data transmission/reception enable clock is carried out in synchronization with this synchronization signal and at the same time the data transmission of the plurality of bits is carried out in the NRZ code once the address coincides with the predetermined address. Furthermore, in the network system according to the present invention one or a plurality of the synchronization signals are produced within one time slot of the address clock signal and the data comprising a plurality of bits can be transmitted in the NRZ code a plural number of times by a predetermined number of bits taking synchronization with the synchronization signal(s). Consequently, the data having the plurality of bits can be transmitted at a higher speed without generation of high frequency noise from the data and address clock transmission lines.

In addition, since the network system according to the present invention does not always require a high accuracy for the data transmission/reception enable clock (oscillator), the inexpensive network system can accordingly be achieved.

It will clearly be appreciated by those skilled in the art that the foregoing description is made in terms of the preferred embodiments and various changes and modfications may be made without departing the scope of the present invention which is to be defined by the appended claims.

What is claimed is:

1. A network system having a plurality of interconnected data processing stations, comprising:

(a) first means for generating and transmitting a periodic first pulse train signal according to a predetermined time series code string;

(b) second means for processing the first pulse train signal received from siad first means to form at least one intermediate synchronization signal and one of a plurality of predetermined code string patterns sequentially together with the synchronization signal during a time slot defining at least one code of the predetermined time series code;

(c) third means, including a data transmission and reception enable clock, for outputting a data transmission and reception enable clock signal whenever each time slot defining any one code of said predetermined time series code string is started, while correcting a frequency variation of said data transmission and reception enable clock by means of said intermediate synchronization signal received from said second means;

(d) fourth means for determining whether one of said plurality of predetermined code string patterns received from said second means accords with a predetermined code indicating an address; and (e) fifth means for carrying out at least one of transmission and reception of a data of a predetermined number of bits in a Non-Return-To-Zero code in synchronization with said corrected data transmission and reception enable clock signal received from said third means depending on the contents of said predetermined address code when said fourth means determines that the one of said plurality of predetermined code string patterns accords with said predetermined address code.

2. The network system according to claim 1, wherein said first means includes a first line for transmitting said first pulse train signal generated by said first means to the plurality of said data processing stations and which further includes second line disposed in parallel to said first line provided for a transmitting said data from said fifth means of one data processing station to at least another one of said fifth means of other data processing stations.

3. The network system according to claim 1, wherein said first means for generating and transmitting a periodic first pulse train comprises:

(a) sixth means for generating a reference clock pulse train signal, each clock pulse thereof having a reference clock period;

(b) seventh means for generating a predetermined time series code string signal; and (c) eighth means for outputting said first pulse train signal in accordance with said reference clock pulse train signal and said predetermined time series code string signal in such a form that a time slot defining one code of the predetermined time series code string corresponds to said reference clock period and that a time slot defining the other code thereof corresponds to said reference clock period multiplied by a plural number.

4. The network system according to claim 3, wherein said second means forms said intermediate synchronization signal whenever an intermediate point of the time slot defining the other code of said predetermined time series code string is reached.

5. The network system according to claim 4, wherein said second means further forms a second pulse train signal, each pulse of said second pulse train signal having a predetermined pulsewidth and rising whenever each pulse of said first pulse train signal from said first means rises and wherein said third means outputs said data transmission and reception enable clock signal in response to each rising edge of said second pulse train signal.

6. The network system according to claim 5, wherein said second means forms each of said plurality of predetermined code string patterns in synchronization with each rising edge of said second pulse train signal.

7. The network system according to claim 5, wherein said third means halts the output of said data transmission and reception enable clock signal when the number of enable clocks of said data transmission and reception enable clock signal reaches a predetermined number so that said fifth means transmits or receives the data of the number of bits corresponding to the predetermined number of the enable clocks of said data transmission and reception enable clock signal.

8. The network system according to claim 5, wherein said third means temporarily halts the output of said data transmission and reception enable clock signal when the number of enable clocks of said data transmission and reception enable clock signal reaches a predetermined number and restarts and continues th output of said data transmission and reception enable clock signal in response to the rising edge of said intermediate synchronization signal until the number of the enable clocks thereof reaches said predetermined number during the time slot defining the other code of said predetermined time series code string so that said fifth means transmits or receives the data of the predetermined number of bits in the Non-Return To Zero code a plural number of times corresponding to said plural number by which said reference clock period is multiplied for the time slot defining the other code by bits having the number corresponding to said predetermined number.

9. The network system according to claim 4, wherein said intermediate point is substantially a center of the time slot defining the other code of said predetermined code string.

10. The network system according to claim 1, wherein said predetermined time series code string is a three-order M series code string.

11. The network system according to claim 1, wherein said first means for generating and transmitting a periodic first pulse train comprises:

(a) sixth means for generating a reference clock pulse train signal, each clock pulse thereof having a reference clock period;
(b) seventh means for generating a predetermined time series code string signal;
(c) eighth means for generating a second pulse train signal, each pulse thereof being generated whenever said reference clock pulse of said reference clock pulse train signal of said sixth means rises and falls; and
(d) ninth means for receiving said reference clock pulse train signal and said second pulse train signal and outputting said first pulse train signal in such a form that said first pulse train is said second pulse train signal during a time slot defining one code of said predetermined time series code string and is said reference clock pulse train signal during a time slot defining another code of said perdetermined time series code string, said time slot corresponding to said reference clock period.

12. The network system according to claim 11, wherein said second means demodulates said reference clock pulse train signal from said first pulse train signal received from said first means so that said intermediate synchronization signal is formed whenever said demodulated reference clock pulse train signal falls.

13. The network system according to claim 12, wherein said second means forms each of said plurality of predetermined code string patterns in synchronization with said demodulated reference clock pulse train signal.

14. The network system according to claim 12, wherein said fourth means outputs a signal when one of said plurality of predetermined time series code string patterns accords wth said predetermined address code, said intermediate synchronization signal is outputted to said third means during a subsequent time slot defining one code of the predetermined code string and said third means receives said output signal of said fourth means and said intermediate synchronization signal of said second means, outputs said data transmission and reception enable clock signal to said fifth means when said output signal of said fourth means rises, temporarily halts the output of said data transmission and reception enable clock signal when the number of enable clocks of said data transmission and reception enable clock signal reaches a predetermined number and outputs again said data transmission reception enable clock signal after the temporary halt until said output signal of said fourth means falls.

15. The network system according to claim 14, wherein said fifth means comprises data transmitting means which transmits data of said predetermined number of bits when said fourth means determines that the one of said plurality of predetermined code string patterns accords with said predetermined address code whose contents indicates the data transmission therefrom and said transmitting means transmits data of said predetermined number of bits in synchronization with each falling edge of said data transmission and reception enable clock signal received from said third means, so that said data is transmitted by a number of bits corresponding to said predetermined number of the enable clocks of said data transmission and reception enable clock signal.

16. The network system according to claim 14, wherein said fifth means comprises data receiving means which receives data of said predetermined number of bits when said fourth means determines that the one of said plurality of predetermined code string patterns accords with said predetermined address code whose contents indicates the data reception thereat and said data receiving means receives said data in synchronization with each falling edge of said data transmission and reception enable clock signal received from said third means, so that said data is received by a number of bits corresponding to said predetermined number of the enable clocks of said data transmission and reception enable clock signal.

17. The network system according to claim 14, wherein said data includes a parity bit.

18. The network system according to claim 11, wherein said predetermined time series code string is a five-order M series code string.

19. The network system according to claim 1, wherein said first means for generating and transmitting a periodic first pulse train signal comprises:

(a) sixth means for generating a reference clock pulse train signal, each clock pulse thereof having a reference clock period;

(b) seventh means for generating a predetermined time series code string signal;

(c) eighth means for frequency dividing said reference clock pulse train signal by a plurality of predetermined integers, the frequency divided reference clock pulse train signal by a greatest integer of said plurality of predetermined integers being sent to said seventh means so that a time slot defining each code of said predetermined time series code string corresponds to a time slot of said frequency divided reference clock pulse train signal sent thereto; and (d) ninth means for outputting said first pulse train signal in such a form that said first pulse train signal has a first pulsewidth corresponding to that of the frequency divided reference clock pulse train signal by a smallest integer of said plurality of predetermined integers when the time slot defining one code of said predetermined time series code string is started and has a second pulsewidth corresponding to that combined with two frequency divided reference clock pulse train signals by the smallest and next smallest integers when the time slot defining the other code of said predetermined time series code string is started.

20. The network system according to claim 19, wherein said second means forms said intermediate synchronization signal by a suitable number according to an accuracy of said data transmission and reception enable clock within one time slot defining each code of said predetermined time series code string by selecting the number of said plurality of predetermined integers set in said eighth means.

* * * * *